UNITED STATES PATENT OFFICE.

WALTER O. SNELLING, OF ALLENTOWN, PENNSYLVANIA.

FERTILIZING METHOD AND MATERIAL.

1,289,565.   Specification of Letters Patent.   Patented Dec. 31, 1918.

No Drawing. Original application filed April 17, 1915, Serial No. 22,005. Divided and this application filed July 16, 1918. Serial No. 245,172.

*To all whom it may concern:*

Be it known that I, WALTER O. SNELLING, a citizen of the United States, and resident of Allentown, Lehigh county, Pennsylvania, have invented certain Improvements in Fertilizing Methods and Materials, (being a division of application Serial No. 22,005, filed April 17, 1915,) of which the following is a specification.

My invention relates to the fertilizing and conditioning of the soils, and it has special reference to the use of explosives for such purpose.

In my application above referred to, of which this is a division, I have disclosed a method of fertilizing the soil based upon the principle that a charge of explosive, containing a fertilizer in addition to the ingredients necessary for explosive action, may be fired underground, and will then serve not only to loosen the soil but also to thoroughly distribute the associated fertilizing material in the loosened earth throughout a considerable radius where it will be available to growing plants.

In my said application I disclosed, but did not specifically claim, the distribution in the soil, by means of explosives, of nitrogen-fixing bacteria, or other micro-organisms helpful to plant growth, and the object of my present application is to cover said method, and material for practising the same.

I have discovered that the inoculation of soils with nitrogen-fixing bacteria or with other micro-organisms helpful to plant growth, may be readily accomplished by placing small amounts of earth or other suitable carrier or culture medium, charged with the desired micro-organisms, in connection with explosive charges, and exploding such charges at suitable intervals beneath the surface of the fields to be inoculated. The distribution of these valuable adjuncts through the soil is greatly facilitated by this procedure, such treatment being of great value where it is desired to inoculate the soil with nitrifying bacteria for growing albuminous plants, such as alfalfa, soy bean, clover, vetches and the like. Although the heat of explosion is intense, it is of very short duration, and I have found experimentally that earth or any suitable culture medium inoculated with nitrogen-fixing bacteria is not sterilized by the explosion.

The inoculated culture medium may be mixed with the ordinary ingredients of a suitable explosive, and made up in the usual manner in sticks or cartridges, or I can inclose an ordinary stick or cartridge of any desired explosive in an envelop or outer wrapping containing the culture carried in the manner set forth in my original application Serial No. 22,005, of which this is a division.

I claim—

1. The method of fertilizing soil that comprises exploding in the soil a charge of an explosive material associated with micro-organisms that are helpful to plant growth.

2. An explosive for agricultural use comprising an explosive material associated with nitrogen-fixing bacteria.

3. An explosive for agricultural use comprising an explosive material associated with a body of material inoculated with nitrogen-fixing bacteria.

4. An explosive cartridge for agricultural use comprising a body of explosive surrounded by a material inoculated with nitrogen-fixing bacteria and means for maintaining the same materials in the said relation.

5. An explosive cartridge for agricultural use comprising a body of explosive surrounded by a material inoculated with nitrogen-fixing bacteria and an outer envelop inclosing the said inoculated material.

WALTER O. SNELLING.